US010638420B2

(12) United States Patent
Sasadai

(10) Patent No.: US 10,638,420 B2
(45) Date of Patent: Apr. 28, 2020

(54) INFORMATION PROCESSING APPARATUS SELECTIVELY EXECUTABLE A NORMAL MODE OR A SLEEP MODE, AND NON-TRANSITORY COMPUTER READABLE RECORDING MEDIUM THAT RECORDS AN INFORMATION PROCESSING PROGRAM EXECUTABLE BY AN INFORMATION PROCESSING APPARATUS SELECTIVELY EXECUTABLE A NORMAL MODE OR A SLEEP MODE

(71) Applicant: KYOCERA DOCUMENT SOLUTIONS INC., Osaka (JP)

(72) Inventor: Koji Sasadai, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/142,961

(22) Filed: Sep. 26, 2018

(65) Prior Publication Data

US 2019/0104468 A1 Apr. 4, 2019

(30) Foreign Application Priority Data

Sep. 29, 2017 (JP) .................................. 2017-189257

(51) Int. Cl.
*H04W 4/00* (2018.01)
*H04W 52/02* (2009.01)
(Continued)

(52) U.S. Cl.
CPC ......... *H04W 52/0203* (2013.01); *H04L 12/12* (2013.01); *H04L 41/0213* (2013.01); *H04W 84/12* (2013.01)

(58) Field of Classification Search
None
See application file for complete search history.

(56) References Cited

U.S. PATENT DOCUMENTS 7,584,319 B1* 9/2009 Liao ................... G06F 13/4022
370/357
2008/0270584 A1* 10/2008 Liu ..................... H04L 41/0213
709/223
(Continued)

FOREIGN PATENT DOCUMENTS

JP 2011-134017 A 7/2011
JP 2012-227730 A 11/2012

*Primary Examiner* — Elisabeth Benoit Magloire
(74) *Attorney, Agent, or Firm* — Li & Cai Intellectual Property (USA) Office

(57) ABSTRACT

The processor of the main system operates as a network interface controller module that reads an identifier described in a header of an application layer of a request frame received by the network interface, and registers the identifier in the identifier list, and reads the identifier described in a header of an application layer of a response frame to be sent by the network interface, and deletes the identifier from the identifier list, and an energy-saving controller module that determines whether or not an identifier remains in the identifier list when the information processing apparatus is about to shift from the normal mode to the sleep mode, if it is determined that an identifier remains, temporarily stops shifting from the normal mode to the sleep mode, and if it is determined that no identifier remains, shifts from the normal mode to the sleep mode.

7 Claims, 8 Drawing Sheets

(51) Int. Cl.
*H04L 12/24* (2006.01)
*H04L 12/12* (2006.01)
*H04W 84/12* (2009.01)

(56) References Cited

U.S. PATENT DOCUMENTS

| | | | |
|---|---|---|---|
| 2009/0006435 A1* | 1/2009 | Mojica | H04L 41/0213 |
| 2009/0238081 A1* | 9/2009 | Miyata | H04L 43/0817 |
| | | | 370/241 |
| 2011/0295709 A1* | 12/2011 | Kubo | G06Q 30/0601 |
| | | | 705/26.1 |
| 2014/0241701 A1* | 8/2014 | Nakano | G11B 27/031 |
| | | | 386/281 |

* cited by examiner

INFORMATION PROCESSING APPARATUS SELECTIVELY EXECUTABLE A NORMAL MODE OR A SLEEP MODE, AND NON-TRANSITORY COMPUTER READABLE RECORDING MEDIUM THAT RECORDS AN INFORMATION PROCESSING PROGRAM EXECUTABLE BY AN INFORMATION PROCESSING APPARATUS SELECTIVELY EXECUTABLE A NORMAL MODE OR A SLEEP MODE

CROSS REFERENCE TO RELATED APPLICATION

This application claims the benefit of Japanese Priority Patent Application JP 2017-189257 filed Sep. 29, 2017, the entire contents of which are incorporated herein by reference.

BACKGROUND OF THE INVENTION

1. Field of the Invention

The present disclosure relates to an information processing apparatus selectively executable a normal mode and a sleep mode. The present disclosure further relates to a non-transitory computer readable recording medium that records an information processing program.

2. Description of Related Art

In a normal mode, a main controller sends a response in response to a request received from an external device connected to a network. In a sleep mode (main controller is powered off), a sub controller sends a response in response to a request received from an external device connected to a network (so-called proxy response). Such an information processing apparatus is known.

SUMMARY OF THE INVENTION

It is desirable to send, reliably and without delay, a response in response to a received request when shifting form the normal mode to the sleep mode (main controller is powered off).

According to an embodiment of the present disclosure, there is provided an information processing apparatus selectively executable a normal mode or a sleep mode, including:

a main system that operates in the normal mode, the main system including a memory and a processor, the memory storing an identifier list;

a sub system that operates in the sleep mode; and a network interface that executes connectionless communication with an external device connected to a network, when the processor of the main system executes an information processing program, the processor operating as a network interface controller module that reads an identifier described in a header of an application layer of a request frame received by the network interface, and registers the identifier in the identifier list, and reads the identifier described in a header of an application layer of a response frame to be sent by the network interface, and deletes the identifier from the identifier list, and an energy-saving controller module that determines whether or not an identifier remains in the identifier list when the information processing apparatus is about to shift from the normal mode to the sleep mode, if it is determined that an identifier remains, temporarily stops shifting from the normal mode to the sleep mode, and if it is determined that no identifier remains, shifts from the normal mode to the sleep mode.

According to an embodiment of the present disclosure, there is provided a non-transitory computer readable recording medium that records an information processing program executable by an information processing apparatus selectively executable a normal mode or a sleep mode including a main system that operates in the normal mode, the main system including a memory and a processor, the memory storing an identifier list, a sub system that operates in the sleep mode, and a network interface that executes connectionless communication with an external device connected to a network, the information processing program causing the processor of the main system to operate as:

a network interface controller module that reads an identifier described in a header of an application layer of a request frame received by the network interface, and registers the identifier in the identifier list, and reads the identifier described in a header of an application layer of a response frame to be sent by the network interface, and deletes the identifier from the identifier list; and an energy-saving controller module that determines whether or not an identifier remains in the identifier list when the information processing apparatus is about to shift from the normal mode to the sleep mode, if it is determined that an identifier remains, temporarily stops shifting from the normal mode to the sleep mode, and if it is determined that no identifier remains, shifts from the normal mode to the sleep mode.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

1. Overview of Embodiment

There is known an information processing apparatus that shifts from a normal mode to a sleep mode based on a timer for the purpose of energy-saving. The information processing apparatus includes a main system and a sub system. In the normal mode, the main system executes all the control processing. In the sleep mode, the main system is powered off, and only the sub system operates. If the sub system receives a request frame from a network in the sleep mode, the sub system sends a response frame to the network in response to a request, to which the sub system can respond (so-called proxy response). Since the main system does not recover from the sleep mode (does not wake up), energy-saving may be attained.

In the connection-oriented communication such as TCP (Transmission Control Protocol), an information processing apparatus can determine connection information about connection to another device. Because of that fact, when the information processing apparatus should shift from the normal mode to the sleep mode, the main system can stop shifting from the normal mode to the sleep mode until connection between the information processing apparatus and another device is finished (i.e., disconnected). If the connection between the information processing apparatus and another device is established, the main system may send and receive data to and from that device for a while.

To the contrary, in the connectionless communication such as UDP (User Datagram Protocol) and ICMP (Internet Control Message Protocol), an information processing apparatus cannot determine connection information.

Figure 1:
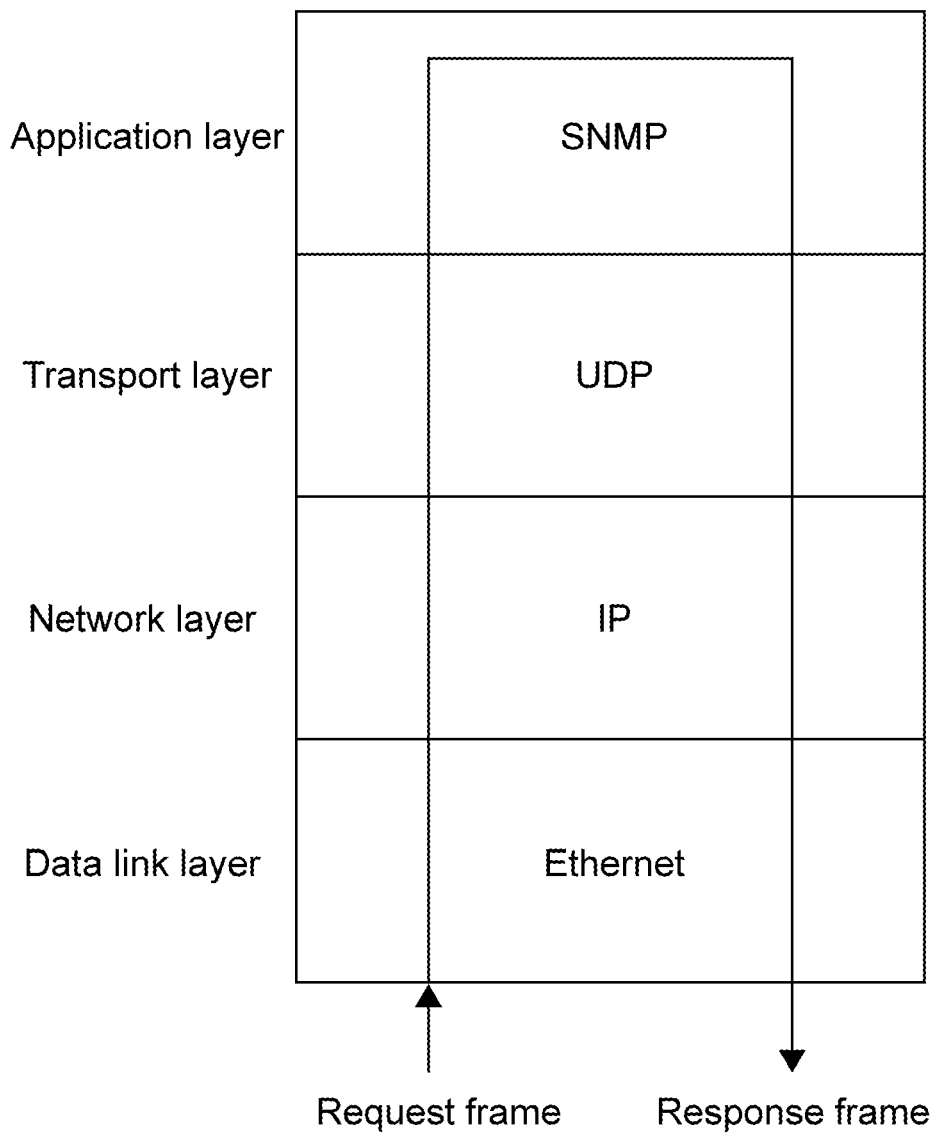
FIG. 1 schematically shows layers of a typical network protocol.

FIG. 1 schematically shows layers of a typical network protocol.

A network interface of an information processing apparatus receives a request frame of the data link layer (Ethernet (registered trademark)) from a network. The request is processed by the network layer (IP (Internet Protocol)), is processed by the transport layer (UDP), and reaches the application layer (for example, SNMP (Simple Network Management Protocol)). A response is generated by the application layer, is processed by the transport layer (UDP), is processed by the network layer (IP), and reaches the data link layer (Ethernet (registered trademark)). The network interface sends the response frame to the network. In the normal mode, the main system executes a series of processing.

Let's say that it becomes time, at which the main system should shift from the normal mode to the sleep mode, based on a timer after the network interface controller module receives a request frame and before the network interface controller module sends a response frame. As described above, in the connectionless communication such as UDP, the main system cannot determine connection information. As a result, the main system cannot determine that there is a response frame to be sent. In other words, the main system cannot determine whether a request received by the network interface controller module has reached the network layer (IP), the transport layer (UDP), or the application layer (SNMP), or whether a response generated by the application layer (SNMP) has reached the transport layer (UDP) or the network layer (IP).

As a result, the information processing apparatus shifts from the normal mode to the sleep mode (main system is powered off) based on a timer without sending a response frame to be sent by the main system. The main system, which is powered off, cannot send a response frame to be sent. As a result, if the sleep mode continues after a certain time period passes (timeout defined in an application protocol such as SNMP) after sending and receiving a request, the main system cannot send a response frame. Alternatively, if the main system recovers from the sleep mode to start the normal mode before the timeout, the main system sends a response frame, but not in real time.

In view of the aforementioned circumstances, according to the present embodiment, in the connectionless communication such as UDP, a main system sends, reliably and without delay, a response frame in response to a request frame that the main system receives in the normal mode. In other words, the main system sends a response frame in response to a received request frame reliably and without delay, and then shifts from the normal mode to the sleep mode.

Figure 2:
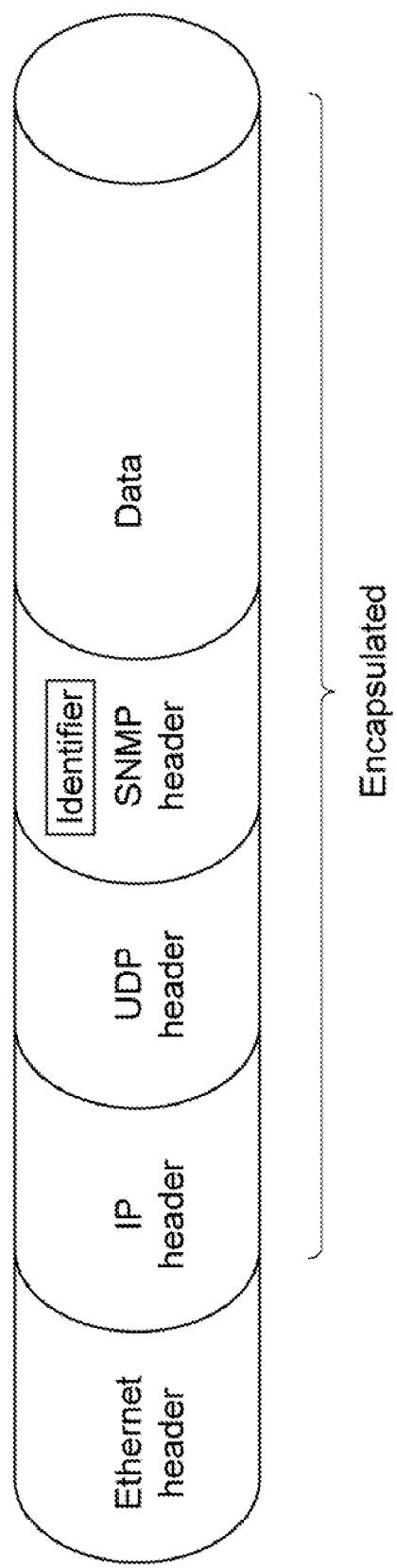
FIG. 2 schematically shows a frame according to an example of the present embodiment.

FIG. 2 schematically shows a frame according to an example of the present embodiment.

In view of the aforementioned circumstances, according to the present embodiment, in the connectionless communication such as UDP, an identifier is described in the header of the application layer (SNMP) of a request frame.

In SNMP, a request ID (Identifier) may be used as an identifier. In DNS (Domain Name System), a transaction ID may be used as an identifier. In an application protocol, in which such an ID is not described in the header, an arbitrary identifier may be described in the header of the application layer.

In a frame (request frame) of a data link layer processed by a network interface controller module, data is encapsulated except for a data link layer header. Because of this structure, typically, a network interface controller module does not read the data other than the data link layer header.

According to the present embodiment, to the contrary, in the main system, a network interface controller module reads an identifier described in the header of the application layer (SNMP) of a received request frame. Further, the network interface controller module reads an identifier described in the header of the application layer (SNMP) of a response frame to be sent. In short, a data link layer, which is the closest to the network, functions as a so-called filter. When the information processing apparatus should shift from the normal mode to the sleep mode, the main system determines whether or not there is a response frame to be sent by using an identifier read by the network interface controller module. As a result, in the connectionless communication such as UDP, the main system sends a response frame, and then shifts from the normal mode to the sleep mode.

Hereinafter, an embodiment of the present disclosure will be described with reference to the drawings.

2. Hardware Configuration of Information Processing Apparatus

Figure 3:
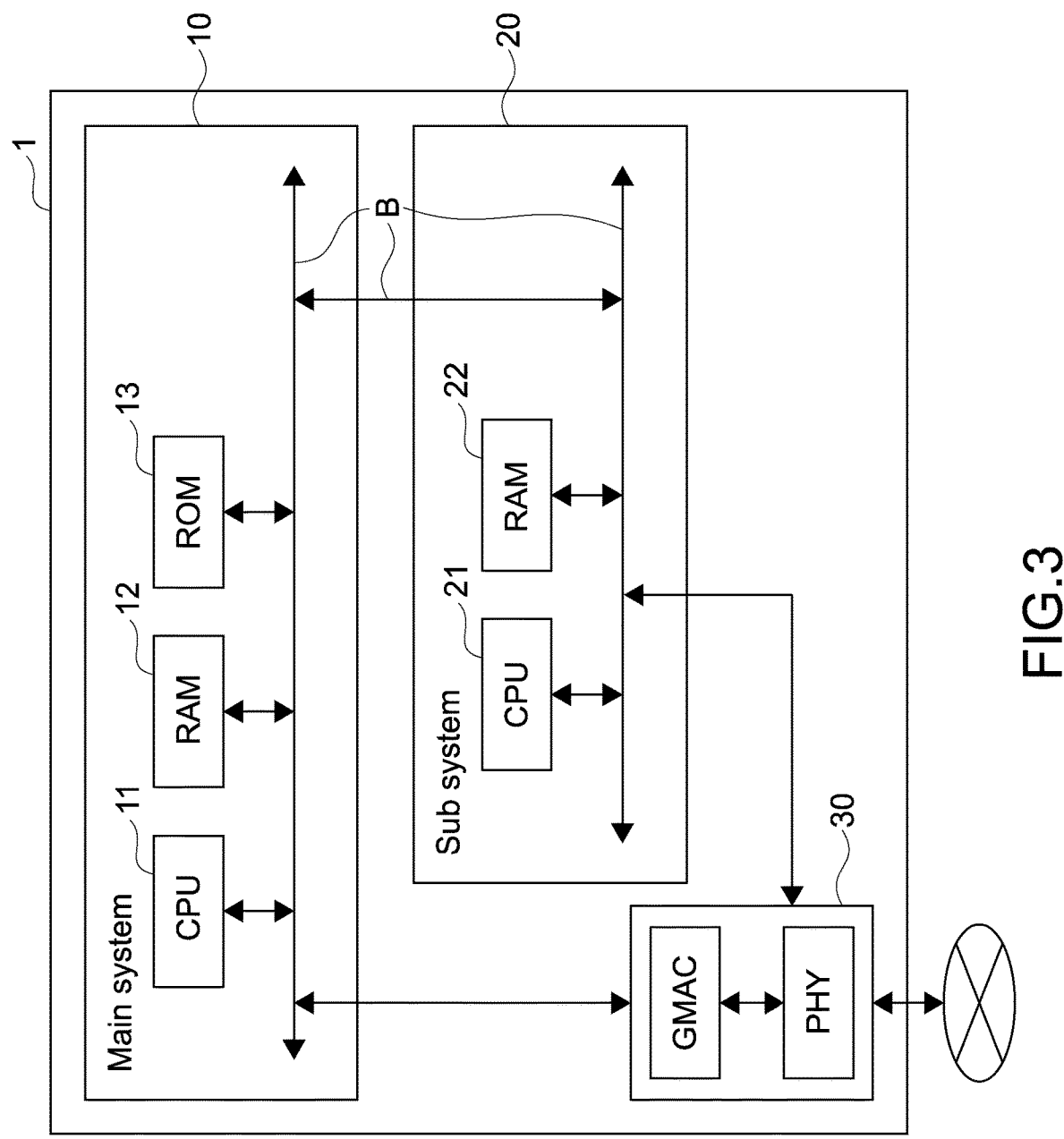
FIG. 3 shows a hardware configuration of an information processing apparatus according to an embodiment of the present disclosure.

FIG. 3 shows a hardware configuration of an information processing apparatus according to an embodiment of the present disclosure.

The information processing apparatus 1 includes the main system 10, the sub system 20, and the network interface 30. Typical examples of the information processing apparatus 1 include a personal computer and an image forming apparatus (for example, multifunction peripheral, MFP).

The main system 10 includes the CPU (Central Processing Unit) 11, the RAM (Random Access Memory) 12, and the ROM (Read Only Memory) 13.

The CPU 11 functions as an arithmetic processing device and a controller device, and executes various programs to control the overall operations of the main system 10. The RAM 12 temporarily stores programs executed by the CPU 11 and parameters appropriately changes during execution of the programs. The ROM 13 stores programs, arithmetic parameters, and the like used by the CPU 11. The ROM 13 further stores unique information of the information processing apparatus 1 such as the host name and the IP address.

The sub system 20 includes the CPU 21 and the RAM 22.

The CPU 21 functions as an arithmetic processing device and a controller device, and executes various programs to control the overall operations of the sub system 20. The RAM 22 temporarily stores programs executed by the CPU 21 and parameters appropriately changes during execution of the programs.

The main system 10, the sub system 20, and the network interface 30 are connected to each other via the bus B.

The network interface 30 is an interface to connect to a network such as a wireless LAN. The main system 10 and the sub system 20 independently connect to the network via the network interface 30. The network interface 30 is an interface of a physical layer (PHY). In a data link layer such as GMAC (Ethernet (registered trademark) MAC), the network interface 30 converts electronic signals to logical signals (bit string) (when receiving), and converts logical signals (bit string) to electronic signals (when sending). The network interface 30 is an interface of a physical layer (PHY). The network interface 30 receives a request frame from an external device connected to the network, and outputs the request frame to the main system 10 or the sub system 20. The network interface 30 sends a response frame, which is generated by the main system 10 or the sub system 20, to the external device connected to the network. The network interface 30 may be a detachable LAN interface connected to the network.

The information processing apparatus 1 shifts from the normal mode to the sleep mode based on a timer (not shown). In the normal mode, the main system 10 executes all the control processing. In the sleep mode, the main system 10 is powered off, and only the sub system 20 operates. If the sub system 20 receives a request frame from the network in the sleep mode, while the main system 10 does not recover from the sleep mode (does not wake up), the sub system 20 sends a response frame to the network in response to a request, to which the sub system 20 can respond (so-called proxy response). The information processing spec of the main system 10 is higher than that of the sub system 20, and the energy consumption of the main system 10 is larger than that of the sub system 20. Therefore the energy consumption in the sleep mode, in which the main system 10 does not operate and only the sub system 20 operates, is smaller than the energy consumption in the normal mode, in which the main system 10 operates.

3. Functional Configuration of Information Processing Apparatus

Figure 4:
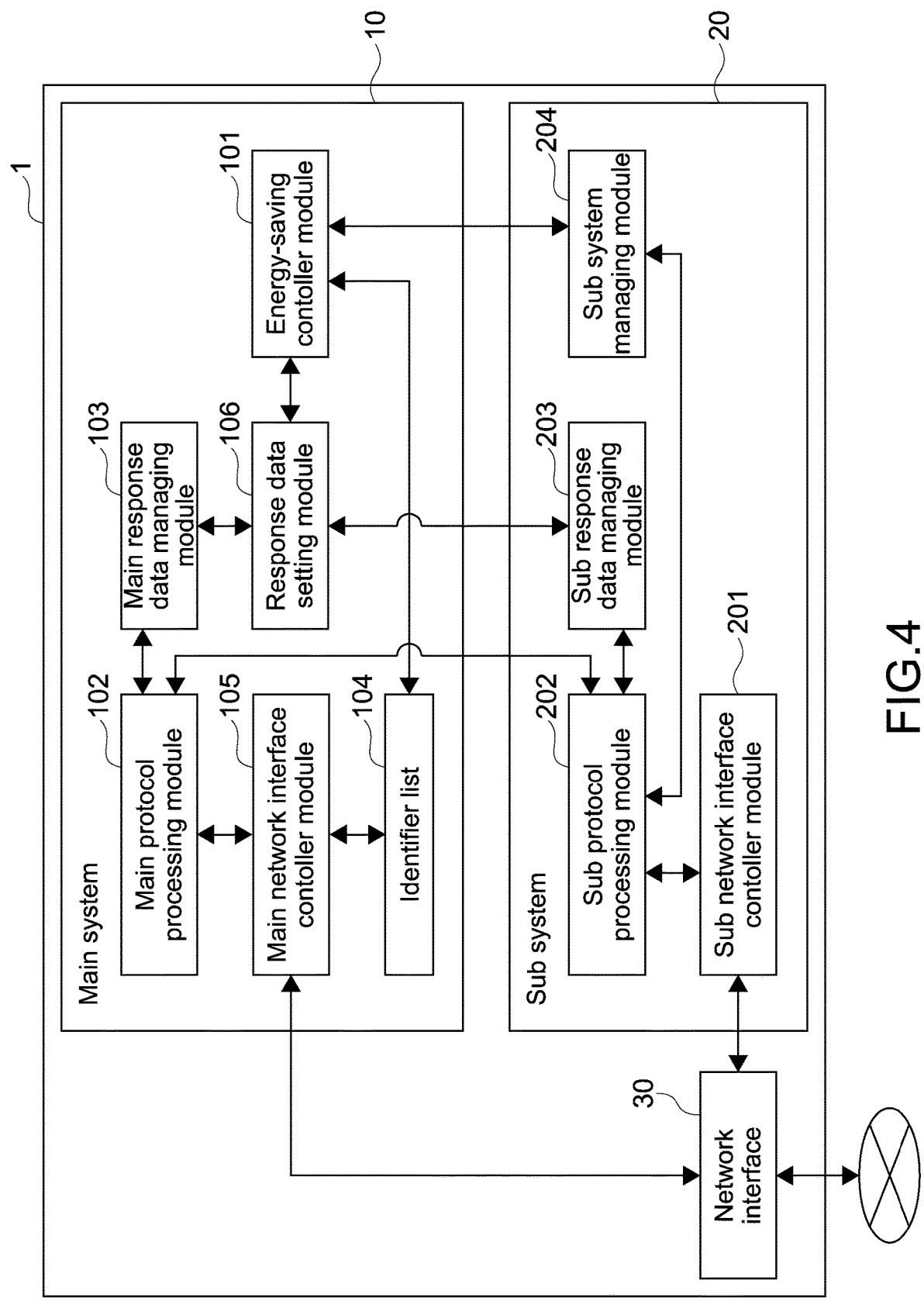
FIG. 4 shows a functional configuration of an information processing apparatus.

FIG. 4 shows a functional configuration of an information processing apparatus.

The main system 10 includes the energy-saving controller module 101, the main protocol processing module 102, the main response data managing module 103, the identifier list 104, the main network interface controller module 105, and the response data setting module 106.

The main network interface controller module 105 controls the network interface 30 to send and receive frames to and from external devices connected to the network. The main network interface controller module 105 reads the identifier described in the header of the application layer of a request frame received by the network interface 30, and registers the identifier in the identifier list 104. The main network interface controller module 105 reads the identifier described in the header of the application layer in a response frame to be sent by the network interface 30, and deletes the identifier from the identifier list 104.

With reference to the main response data managing module 103, the main protocol processing module 102 generates response data. The main protocol processing module 102 describes the identifier, which is the same as the identifier described in the header of the application layer (SNMP) of the request, in the header of the application layer (SNMP) of the response. The main protocol processing module 102 supplies the generated response data to the main network interface controller module 105. The main protocol processing module 102 is configured to process the application layer protocol. The application layer protocol is, for example, SNMP.

The response data setting module 106 causes the main response data managing module 103 and the sub response data managing module 203 to store information to respond to an external device (unique identifier information and the like of the information processing apparatus 1).

The energy-saving controller module 101 shifts from the normal mode to the sleep mode (the main system 10 is powered off) based on the timer. The energy-saving controller module 101 informs the sub system 20 that the information processing apparatus 1 will shift from the normal mode to the sleep mode. The energy-saving controller module 101 determines whether or not an identifier remains in the identifier list 104 when the information processing apparatus 1 is about to shift from the normal mode to the sleep mode, if it is determined that an identifier remains, temporarily stops (i.e., delays) shifting from the normal mode to the sleep mode, and if it is determined that no identifier remains, shifts from the normal mode to the sleep mode. If the energy-saving controller module 101 obtains a recovery request from the sub system managing module 204 in the sleep mode, the energy-saving controller module 101 boots up the main system 10, i.e., causes the main system 10 to recover from the sleep mode.

The sub system 20 includes the sub network interface controller module 201, the sub protocol processing module 202, the sub response data managing module 203, and the sub system managing module 204.

The sub network interface controller module 201 controls the network interface 30 to send and receive frames to and from external devices connected to the network in the sleep mode.

With reference to the sub response data managing module 203, the sub protocol processing module 202 generates a response in response to a request received from an external device by the sub network interface controller module 201.

The sub system managing module 204 supplies a recovery request from the sleep mode to the normal mode to the main system 10.

4. Operation of Main System

Figure 5:
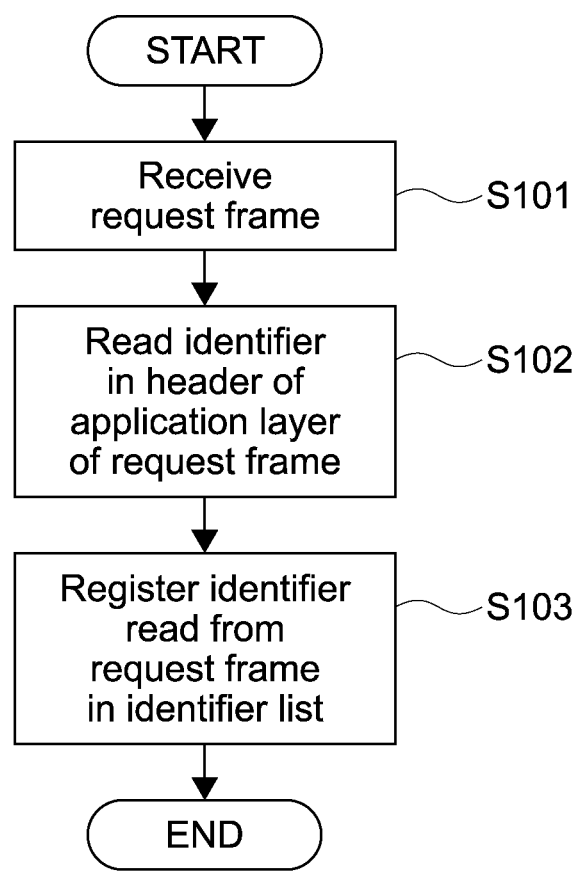
FIG. 5 shows an operational flow of the main network interface controller module when receiving a request frame.

FIG. 5 shows an operational flow of the main network interface controller module when receiving a request frame.

The main network interface controller module 105 receives a request frame via the network interface 30 (Step S101). The main network interface controller module 105 reads the identifier described in the header of the application layer of the received request frame (Step S102). The main network interface controller module 105 registers the read identifier in the identifier list 104 (Step S103).

The main protocol processing module 102 describes an identifier in the header of the application layer of the response, the identifier being the same as the identifier described in the header of the application layer of the request.

Figure 6:
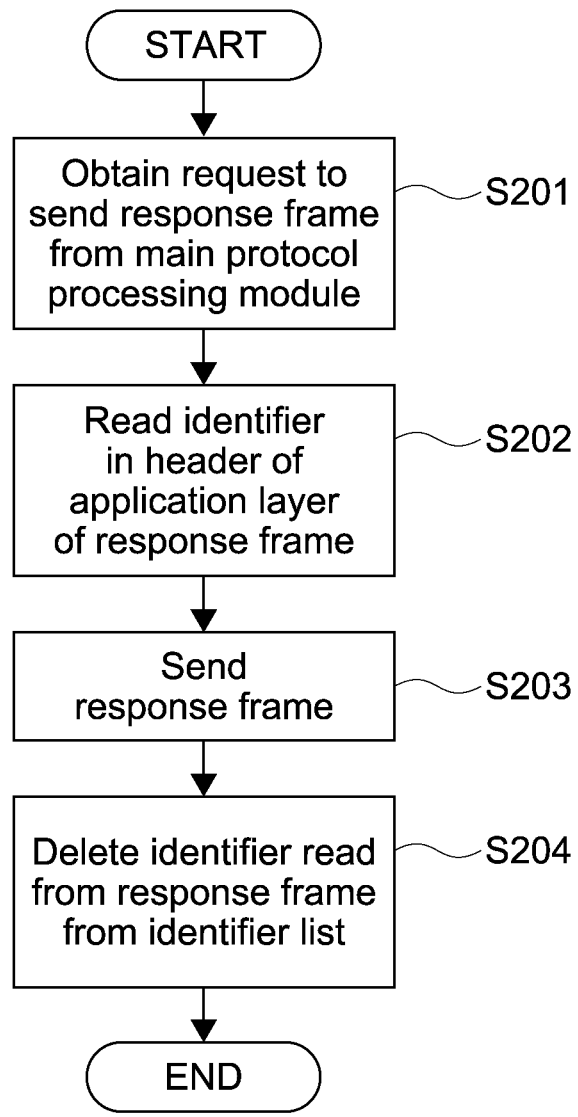
FIG. 6 shows an operational flow of the main network interface controller module when sending a request frame.

FIG. 6 shows an operational flow of the main network interface controller module when sending a request frame.

The main network interface controller module 105 obtains a request to send a response frame from the main protocol processing module 102 (Step S201). The main network interface controller module 105 reads the identifier described in the header of the application layer of the response frame to be sent (Step S202). The main network interface controller module 105 sends the response frame via the network interface 30 (Step S203). The main network interface controller module 105 deletes the identifier read from the response frame from the identifier list 104 (Step S204).

Alternatively, as a modification example, the main network interface controller module 105 may delete the identifier read from the response frame from the identifier list 104 (Step S204), and then send the response frame (Step S203). However, according to the inverted order, the information processing apparatus 1 may shift from the normal mode to the sleep mode after deleting the identifier from the identifier list 104 (Step S204) and before sending the response frame (Step S203). In view of the above, according to the present embodiment, the main network interface controller module 105 sends the response frame (Step S203), and then deletes the identifier from the identifier list 104 (Step S204).

Figure 7:
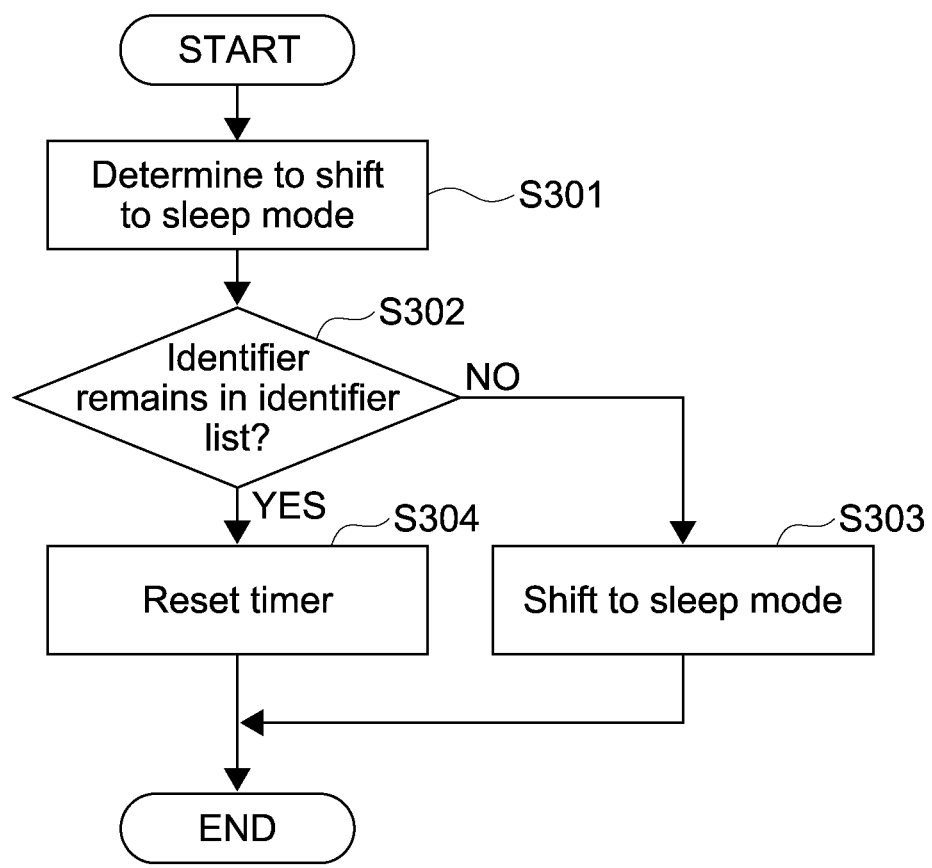
FIG. 7 shows an operational flow of the energy-saving controller module when shifting from the normal mode to the sleep mode.

FIG. 7 shows an operational flow of the energy-saving controller module when shifting from the normal mode to the sleep mode.

The energy-saving controller module 101 determines that the information processing apparatus 1 should shift from the normal mode to the sleep mode based on a timer (Step S301). With reference to the identifier list 104, the energy-saving controller module 101 determines whether or not any identifier remains in the identifier list 104 (i.e., whether or not a response is sent) (Step S302). If it is determined that nothing remains in the identifier list 104 (i.e., response is sent) (Step S302, NO), the energy-saving controller module 101 immediately shifts from the normal mode to the sleep mode (Step S303).

Meanwhile, if it is determined that any identifier remains in the identifier list 104 (i.e., response is not sent) (Step S302, YES), the energy-saving controller module 101 temporarily stops (i.e., delays) shifting from the normal mode to the sleep mode. Specifically, the energy-saving controller module 101 resets the timer (Step S304). Then, if the energy-saving controller module 101 again determines that the information processing apparatus 1 should shift from the normal mode to the sleep mode based on the timer (Step S301), the process on and after Step 5302 will be executed.

Figure 8:
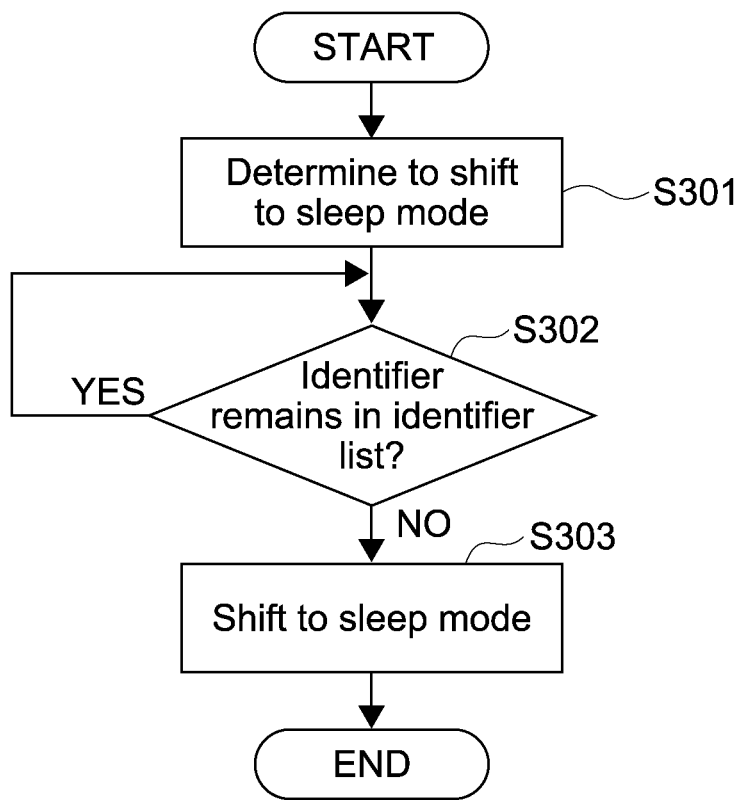
FIG. 8 shows a modification example of an operational flow of the energy-saving controller module when shifting from the normal mode to the sleep mode.

FIG. 8 shows a modification example of an operational flow of the energy-saving controller module when shifting from the normal mode to the sleep mode.

As a modification example, if the energy-saving controller module 101 determines that any identifier remains in the identifier list (i.e., response is not sent) (Step S302, YES), the energy-saving controller module 101 may determine whether or not any identifier remains in the identifier list 104 again (Step S302) without resetting the timer (Step S304). Also according to this method, shifting from the normal mode to the sleep mode is temporarily stopped (i.e., delayed). Rather, the energy-saving controller module 101 can determine that nothing remains in the identifier list 104 (i.e., response is sent) (Step S302, NO) faster than the method of resetting the timer (Step S304).

5. Conclusion

Let's say that it becomes time, at which the main system should shift from the normal mode to the sleep mode, based on a timer after the network interface controller module receives a request frame and before the network interface controller module sends a response frame. As described above, in the connectionless communication such as UDP, the main system cannot determine connection information. As a result, the main system cannot determine that there is a response frame to be sent. In other words, the main system cannot determine whether a request received by the network interface controller module has reached the network layer (IP), the transport layer (UDP), or the application layer (SNMP), or whether a response generated by the application layer (SNMP) has reached the transport layer (UDP) or the network layer (IP).

As a result, the information processing apparatus shifts from the normal mode to the sleep mode (main system is powered off) based on a timer without sending a response frame to be sent by the main system. The main system, which is powered off, cannot send a response frame to be sent. As a result, if the sleep mode continues after a certain time period passes (timeout defined in an application protocol) after sending and receiving a request, the main system cannot send a response frame. Alternatively, if the main system recovers from the sleep mode to start the normal mode before the timeout, the main system sends a response frame, but not in real time.

According to the present embodiment, to the contrary, the network interface controller module 105 reads the identifier described in the header of the application layer of the request frame received by the network interface 30, and registers the identifier in the identifier list 104. The network interface controller module 105 reads the identifier described in the header of the application layer of the response frame to be send by the network interface 30, and deletes the identifier from the identifier list 104. If the information processing apparatus 1 should shift from the normal mode to the sleep mode, the energy-saving controller module 101 determines whether or not an identifier remains in the identifier list 104 (i.e., whether or not response is sent). If it is determined that any identifier remains in the identifier list 104 (i.e., response is not sent), the energy-saving controller module 101 temporarily stops (i.e., delays) shifting from the normal mode to the sleep mode. The energy-saving controller module 101 shifts from the normal mode to the sleep mode only if the energy-saving controller module 101 determines that no identifier remains (i.e., response is sent).

Therefore the main system sends a response frame in response to a received request frame reliably and without delay, and then shifts from the normal mode to the sleep mode. Therefore, in the connectionless communication such as UDP, a main system can send, reliably and without delay, a response frame in response to a request frame that the main system receives in the normal mode.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus selectively executable a normal mode or a sleep mode, comprising:
a main system that operates in the normal mode, the main system including a memory and a processor, the memory storing an identifier list;
a sub system that operates in the sleep mode; and
a network interface that executes connectionless communication with an external device connected to a network,
when the processor of the main system executes an information processing program, the processor operating as
a network interface controller module that
reads an identifier described in a header of an application layer of a request frame received by the network interface, and registers the identifier in the identifier list, and
reads the identifier described in a header of an application layer of a response frame to be sent by the network interface, and deletes the identifier from the identifier list, and
an energy-saving controller module that
determines whether or not an identifier remains in the identifier list when the information processing apparatus is about to shift from the normal mode to the sleep mode,
if it is determined that an identifier remains, temporarily stops shifting from the normal mode to the sleep mode, and
if it is determined that no identifier remains, shifts from the normal mode to the sleep mode.

2. The information processing apparatus according to claim 1, wherein
when the processor of the main system executes the information processing program, the processor further operates as
a protocol processing module that describes an identifier in a header of an application layer of a response, the identifier being the same as the identifier described in the header of the application layer of the request frame.

3. The information processing apparatus according to claim 1, wherein
if it is determined that an identifier remains in the identifier list, the energy-saving controller module again determines whether or not an identifier remains in the identifier list after a certain time period passes.

4. The information processing apparatus according to claim 1, wherein
the network interface controller module controls a data link layer.

5. The information processing apparatus according to claim 1, wherein
a protocol of the application layer is SNMP (Simple Network Management Protocol).

6. The information processing apparatus according to claim 5, wherein
the identifier is a request ID of the SNMP protocol.

7. A non-transitory computer readable recording medium that records an information processing program executable by an information processing apparatus selectively executable a normal mode or a sleep mode including
a main system that operates in the normal mode, the main system including a memory and a processor, the memory storing an identifier list,
a sub system that operates in the sleep mode, and
a network interface that executes connectionless communication with an external device connected to a network,
the information processing program causing the processor of the main system to operate as:
a network interface controller module that
reads an identifier described in a header of an application layer of a request frame received by the network interface, and registers the identifier in the identifier list, and
reads the identifier described in a header of an application layer of a response frame to be sent by the network interface, and deletes the identifier from the identifier list; and
an energy-saving controller module that
determines whether or not an identifier remains in the identifier list when the information processing apparatus is about to shift from the normal mode to the sleep mode,
if it is determined that an identifier remains, temporarily stops shifting from the normal mode to the sleep mode, and
if it is determined that no identifier remains, shifts from the normal mode to the sleep mode.

* * * * *